United States Patent
Turner et al.

(10) Patent No.: US 9,290,093 B2
(45) Date of Patent: Mar. 22, 2016

(54) SUPPLEMENTAL POWER ATTACHMENT FOR A VEHICLE

(71) Applicant: Deere & Company, Moline, IL (US)

(72) Inventors: Christopher D. Turner, Waterloo, IA (US); Gary S. Keys, II, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 72 days.

(21) Appl. No.: 14/090,020

(22) Filed: Nov. 26, 2013

(65) Prior Publication Data

US 2015/0149053 A1     May 28, 2015

(51) Int. Cl.

| | |
|---|---|
| *B60W 10/06* | (2006.01) |
| *B60W 10/08* | (2006.01) |
| *B60W 10/10* | (2012.01) |
| *B60K 25/00* | (2006.01) |
| *F16D 48/06* | (2006.01) |
| *B60K 1/04* | (2006.01) |
| *B60K 16/00* | (2006.01) |
| *B60K 17/28* | (2006.01) |
| *B60K 1/00* | (2006.01) |

(52) U.S. Cl.
CPC . *B60K 25/00* (2013.01); *B60K 1/04* (2013.01); *B60K 16/00* (2013.01); *B60K 17/28* (2013.01); *F16D 48/06* (2013.01); *B60K 1/00* (2013.01); *B60K 2001/0411* (2013.01); *B60K 2001/0416* (2013.01); *B60K 2001/0444* (2013.01); *B60K 2016/003* (2013.01); *B60Y 2200/22* (2013.01); *B60Y 2200/221* (2013.01); *B60Y 2200/41* (2013.01); *B60Y 2400/114* (2013.01); *B60Y 2400/204* (2013.01)

(58) Field of Classification Search
CPC ..... B60W 10/02; B60W 10/06; B60W 10/08; B60W 10/10; B60W 20/10
USPC .................................................. 701/54; 172/3
See application file for complete search history.

(56) References Cited

U.S. PATENT DOCUMENTS

| | | | | |
|---|---|---|---|---|
| 6,443,036 | B1 * | 9/2002 | Martignon | 74/730.1 |
| 8,403,086 | B1 | 3/2013 | Free et al. | |
| 8,617,028 | B2 * | 12/2013 | Kresse et al. | 477/5 |
| 2003/0070819 | A1 * | 4/2003 | Hrazdera | 172/2 |
| 2005/0179262 | A1 | 8/2005 | Cho et al. | |
| 2011/0240385 | A1 | 10/2011 | Farmer | |
| 2012/0266701 | A1 * | 10/2012 | Yamada et al. | 74/15.82 |

FOREIGN PATENT DOCUMENTS

| | | |
|---|---|---|
| DE | 102011078192 | 1/2013 |
| WO | 2004069573 | 8/2004 |

OTHER PUBLICATIONS

Raussendorf-PowerPack 45, http://www.raussendorf.de/pdf/raussendorf-powerpack-01.pdf, Feb. 2, 2012.
European Patent Office Search Report for related application No. EP14183509.0, dated Jun. 15, 2015.

* cited by examiner

*Primary Examiner* — Edwin A Young
(74) *Attorney, Agent, or Firm* — Ingrassia, Fisher & Lorenz PC (57) ABSTRACT

A vehicle attachment and control system for a vehicle attachment are described. The attachment includes a chassis configured to be attached to a vehicle with an onboard power source. The attachment includes an attachment power source supported by the chassis and an energy storage device supported by the chassis and configured to receive power from the attachment power source. The attachment includes a control system configured to transmit a signal to, and receive a signal from, the attachment power source and/or the energy storage device. The control system, the attachment power source, and the energy storage device are configured to provide power from the attachment power source and the energy storage device, via power transfer connections between the vehicle, or an associated implement, and the attachment power source or the energy storage device.

16 Claims, 5 Drawing Sheets

SUPPLEMENTAL POWER ATTACHMENT FOR A VEHICLE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to supplemental power for vehicles, including work vehicles with power take off drives for driving work implements.

BACKGROUND OF THE DISCLOSURE

Various work vehicles (and other vehicles) may include various onboard power sources to provide motive and other power during vehicle operation. For example, work vehicles such as tractors may include internal combustion engines that convert chemical energy to mechanical energy in order to facilitate execution of useful tasks. Certain vehicles, in addition to primary functionality (e.g., driving and hauling functionality), may be capable of secondary functionality, including through the use of attachable implements. For example, tractors may be outfitted with various implements (e.g., loaders, seeders, and so on), which may be attached to the vehicles in various known ways (e.g., through front-end mounts, three-point hitches, and so on). Such implements may be configured to draw power from the vehicle with which they are associated in order to do useful work. For example, a work implement may be designed to draw power from a power take-off shaft at the rear of the vehicle.

Depending on the operating conditions, the type of vehicle used, and the type of implement, execution of various tasks using a vehicle implement may sometimes create issues with regard to power supply. For example, for a tractor with an onboard internal combustion engine capable of providing a given amount of power, execution of a particular task with a particular implement may sometimes detrimentally reduce the amount of power available for other tractor functions or may not be possible, due to incompatibilities between the power demands of the implement and the power needs of other aspects of the tractor. In this regard, the power capabilities of the onboard power source may also be relevant, at least because certain onboard power sources may not be able to generate sufficient power to operate an implement as desired (e.g., while also utilizing other tractor capabilities, such as driving with a towed load). As such, it may be useful to provide a power attachment that, among other advantages, may facilitate on-demand delivery of supplemental power as well as storage of excess power from a primary power source, when the full power of that power source is not otherwise needed.

SUMMARY OF THE DISCLOSURE

A vehicle attachment and control system are disclosed for storing and providing supplemental power.

According to one aspect of the disclosure, a vehicle attachment includes a chassis configured to be attached to a vehicle, the vehicle including an onboard power source. The vehicle attachment includes an attachment power source supported by the chassis. The vehicle attachment includes an energy storage device supported by the chassis and configured to receive power from the attachment power source. The vehicle attachment includes one or more power transfer connections between the vehicle and one or more of the attachment power source and the energy storage device. The vehicle attachment includes a control system including a controller, the control system being configured to transmit a signal to, or receive a signal from, or both, one or both of the attachment power source and the energy storage device. The control system, the attachment power source, and the energy storage device are configured to provide power from one or both of the attachment power source and the energy storage device, via the one or more power transfer connections, to the vehicle or an implement associated with the vehicle, or both.

One or more of the following features may be included. The power transfer connection(s) may be configured to transmit rotational power between the attachment power source and a power take-off shaft included in the vehicle. The power transfer connection(s) may be configured to transmit electric power between the one or more of the attachment power source and the energy storage device and one or more of the vehicle and/or the implement associated with the vehicle. The attachment power source may include an electric machine. The energy storage device may include an electric storage device. The electric machine may be configured to: receive mechanical power from the onboard power source via the power transfer connection(s); utilize the received mechanical power to generate electric power; transmit the generated electric power to the electric storage device for storage; receive electric power from the electric storage device for conversion to mechanical power; and transfer the converted mechanical power to the vehicle and/or the implement associated with the vehicle via the power transfer connection(s).

The vehicle attachment may include a supervisory controller included in the control system. The supervisory controller is configured to monitor one or more parameters including one or more of an onboard power source load, a target engine speed associated with the onboard power source, an actual engine speed associated with the onboard power source, a state of engagement of the implement associated with the vehicle, a state of charge of the electric storage device, an electric storage device temperature, a temperature of a converter in electronic communication with the electric machine and the electric storage device, and an electric machine temperature. The control system is further configured to do one or more of the following: estimate electric storage device health, control flow of power between the electric machine and the electric storage device, and control flow of power into and out of the vehicle attachment via the one or more power transfer connections, based upon, at least in part, the supervisory controller monitoring the one or more parameters.

The control system may be configured to cause storage of electric power in the electric storage device when the onboard power source is not at full load, and when the onboard power source is at full load, cause transfer of power from the vehicle attachment to the vehicle and/or the implement associated with the vehicle. The energy storage device may include a hydraulic energy storage device or an energy recovery system, or both. The chassis may be configured to be attached to, and to be fully supported by, a rear portion of the vehicle.

According to another aspect of the disclosure, a control system for a vehicle attachment includes one or more processor devices and one or more memory architectures coupled with the processor device(s). The vehicle attachment includes a chassis configured to be attached to a vehicle having an onboard power source. The vehicle attachment includes an attachment power source supported by the chassis. The vehicle attachment includes an energy storage device supported by the chassis and configured to receive power from the attachment power source. The vehicle attachment includes one or more power transfer connections between the vehicle and one or more of the attachment power source and the energy storage device. The processor devices are configured to transmit a signal to, and receive a signal from, or both, the attachment power source and/or the energy storage device in order to control provision of power from the attachment power source and/or the energy storage device, via the power transfer connection(s), to the vehicle and/or an implement associated with the vehicle.

The power transfer connection(s) may be configured to transmit rotational power between the attachment power source and a power take-off shaft included in the vehicle. The power transfer connection(s) may be configured to transmit electric power between the attachment power source and/or the energy storage device and the vehicle and the implement associated with the vehicle. The attachment power source may include an electric machine. The energy storage device may include an electric storage device. The devices may be configured to control the electric machine in: receiving mechanical power from the onboard power source via the power transfer connection(s); utilizing the received mechanical power to generate electric power; transmitting the generated electric power to the electric storage device for storage; receiving electric power from the electric storage device for conversion to mechanical power; and transferring the converted mechanical power to the vehicle and/or the implement associated with the vehicle via the power transfer connection(s).

The processor devices may be configured to monitor parameters including an onboard power source load, a target engine speed associated with the onboard power source, an actual engine speed associated with the onboard power source, a state of engagement of the implement associated with the vehicle, a state of charge of the electric storage device, an electric storage device temperature, a temperature of a converter in electronic communication with the electric machine and the electric storage device, and an electric machine temperature. The processor devices may be configured to estimate electric storage device health, control flow of power between the electric machine and the electric storage device, and control flow of power into and out of the vehicle attachment via the one or more power transfer connections, each based upon, at least in part, the supervisory controller monitoring the one or more parameters.

The processor devices may be configured to cause storage of electric power in the electric storage device when the onboard power source is not at full load, and when the onboard power source is at full load, cause transfer of power from the vehicle attachment to one or more of the vehicle and the implement associated with the vehicle. The energy storage device may include a hydraulic energy storage device or an energy recovery system, or both. The chassis may be configured to be attached to, and to be fully supported by, a rear portion of the vehicle.

The details of various implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed supplemental power attachment (also referred to herein as a "vehicle attachment" or, simply, an "attachment") and associated control system, as shown in the accompanying figures of the drawings described briefly above. Various modifications to the example embodiments may be contemplated by one of skill in the art.

As also discussed above, in various circumstances the power needs of a vehicle (e.g., a work vehicle) and various associated implements (e.g., a front-loader or a seeder) may not match up with the power capabilities of a vehicle's onboard power source. For example, in certain instances an onboard internal combustion engine may provide substantially more power than is necessary for unloaded driving over flat ground, but may not provide enough power to execute other functionality, such as a loading operation using an attached implement. Further, even if an onboard power source can provide sufficient power for certain functionality, if the required power represents a significant fraction of the available power, simultaneous execution of other tasks (e.g., use of a second implement) may not be possible (or may not be possible without detrimental effect on performance). As such, it may be useful to provide a vehicle attachment that, among other benefits, is able to receive power from a vehicle's onboard power source when surplus power is available from the onboard source, and to provide power to a vehicle (or an associated implement) when the power provided by the vehicle's onboard power source is inadequate. Such an arrangement, for example, may allow lower-power vehicles to be utilized for intermittent high-power applications, through the storage and provision of surplus power by a supplemental power attachment.

Figure 1:
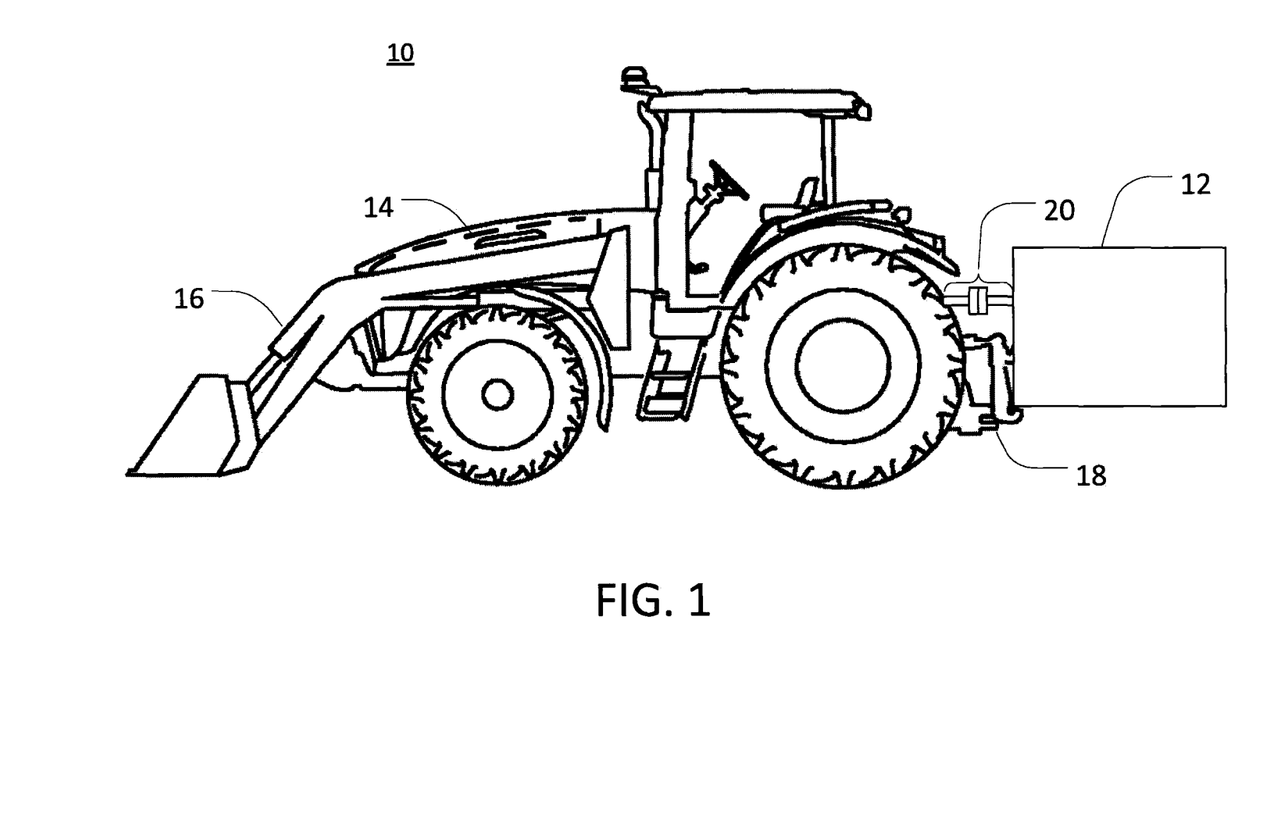
FIG. 1 is a side view of an example vehicle with respect to which a supplemental power attachment, and associated control methods, may be implemented.

As will become apparent from the discussion herein, the disclosed vehicle attachment (or associated control system) may be used advantageously in a variety of settings and with a variety of work machines. For example, referring now to FIG. 1, vehicle 10 is depicted with supplemental power attachment 12 attached thereto. In certain embodiments, vehicle 10 may include onboard power source 14, implement 16, and attachment mount 18. In certain embodiments, power transfer connection 20 may extend between attachment 12 and vehicle 10. As depicted in FIG. 1, vehicle 10 may be a tractor, having an internal combustion engine as onboard power source 14, a front-loader as implement 16, and a three-point hitch as attachment mount 18. It will be understood, however, that these (and other) components may vary in type or configuration in the various embodiments contemplated by this disclosure. For example, vehicle 10 may be a forestry or construction vehicle, onboard power source 14 may include an electric machine, implement 16 may include a variety of different tools and may be configured to attach (permanently or removably) to various portions of vehicle 10, and attachment mount 18 may include a draw-bar or other mechanism configured to allow supplemental power attachment 12 to be securely fixed to vehicle 10. Generally, supplemental power attachment 12 may be capable of receiving surplus power from vehicle 10, storing that power within attachment 12, and, later, drawing from the stored power to provide supplemental power to vehicle 10 (or implement 16).

Supplemental power attachment 12, and the connection between attachment 12 and vehicle 10, may be configured in a variety of ways. For example, referring now also to FIG. 2, supplemental power attachment 12 may include chassis 22, which may be supported by (e.g., mounted to) attachment mount 18. For example, chassis 22 may include metal or other rigid support members on which various internal or external components may be mounted, and which may itself be mounted (directly or indirectly) to attachment mount 18 of vehicle 10. In certain embodiments, attachment mount 18 may be a three-point hitch or another mounting structure that facilitates fixed mounting of chassis 22 to vehicle 10 (e.g., a draw-bar for towing of a trailer including attachment 12). In certain embodiments, attachment mount 18 (e.g., as a three-point hitch) may fully support the weight of vehicle attachment 12, such that attachment 12 is carried solely by vehicle 10. This may be advantageous in various circumstances. For example, in certain embodiments a supplemental power attachment 12 that is fully (or significantly) supported at the back of vehicle 10 may act as a counterweight to a forward implement 16, such as a front loader. In this way, for example, attachment 12 may facilitate useful power storage and delivery while also eliminating (or reducing) the need to attach other counterweights to vehicle 10. In other embodiments, attachment 12 may be less-fully supported by vehicle 10 (e.g., via attachment mount 18). For example, vehicle attachment 12 may include other support architecture, such as a support axle with wheels (not shown), which may support some (or all) of the weight of attachment 12 and facilitate towing of attachment 12 by vehicle 10, without vehicle 10 necessarily supporting all (or any) of the weight of attachment 12. Chassis 22 may be mounted to vehicle 10 in a variety of configurations, including on front (not shown) or rear attachment mounts, and so on.

Figure 2:
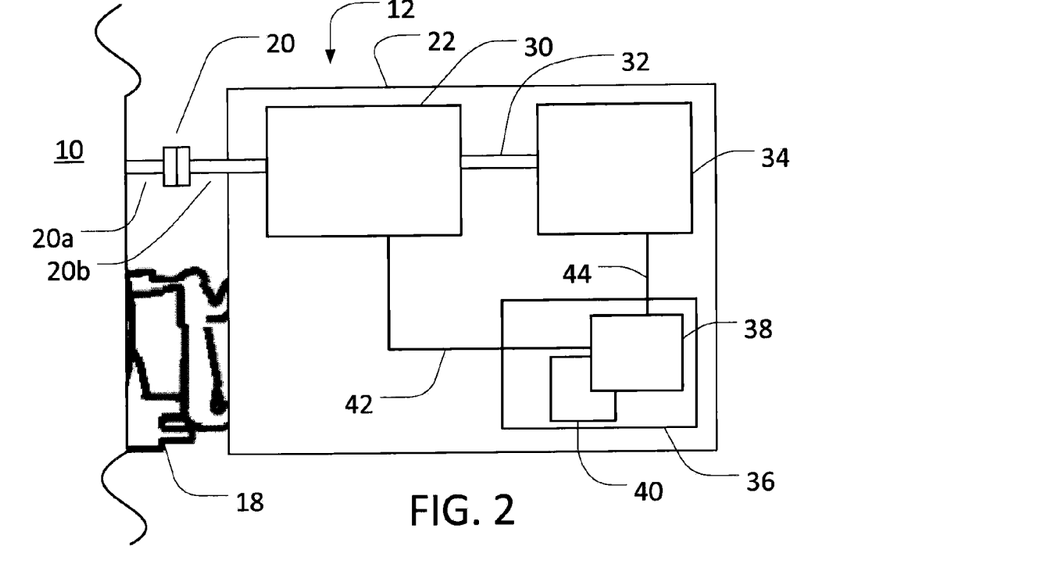
FIG. 2 is a diagrammatic view of a supplemental power attachment associated with the example vehicle of FIG. 1.

Power transfer connection 20 between vehicle 10 and supplemental power attachment 12 may be configured in a variety of ways, which may be related to the configuration of vehicle 10, attachment power source 30, and energy storage device 34. In certain embodiments, power transfer connection 20 may be configured to transfer mechanical power. For example, power transfer connection 20 may be configured as (or to include) a rotary shaft, which may, for example, have a splined connection between an input/output shaft 20b of attachment power source 30 and an out-board power take-off ("PTO") shaft 20a of vehicle 10. (It will be understood that other configurations for transfer of mechanical power may also be possible, such as a geared connection between input/output shaft 20b and a portion of a drive train included in vehicle 10, a belt or chain transmission, or another mechanical configuration.) In certain embodiments, power transfer connection 20 may additionally or alternatively include an electrical conduit for transmission of electrical power, a fluid conduit for transmission of hydraulic fluid or pressure, or various combinations of these or other power transfer mechanisms. In certain embodiments, as also discussed below, multiple power transfer connections (including power transfer connection 20) may extend between vehicle 10 and supplemental power attachment 12 for the transfer of various types of power.

Attachment power source 30, which may be supported by chassis 22, similarly may take a variety of forms. In certain embodiments, for example, attachment power source 30 may be an internal combustion (or other) engine, which may draw fuel from vehicle 10 (e.g., via power transfer connection 20 configured as a fluid conduit) or from a fuel reservoir included on attachment 12. As another example, in certain embodiments, attachment power source 30 may include photoelectric solar panels or other solar energy harvesters/converters.

In certain embodiments, attachment power source 30 may be an electrical machine. For example, attachment power source 30 may be a rotary machine, which may be configured to operate as either a generator of electricity or a motor, for converting electrical energy to rotary mechanical power, with the operating mode of power source 30 depending on whether supplemental power attachment 12 is currently storing or providing power (e.g., as controlled via control system 36, as discussed in greater detail below). In such an embodiment, for example, power transfer connection 20 may be configured as a rotating shaft for transmitting rotary power between vehicle 10 and attachment 12, and power transfer connection 32 may be configured as an electrical conduit for transfer of electric power between attachment power source 30 (e.g., generator/motor 30) and energy storage device 34, which may be configured to include batteries or another electric storage device, such as a capacitor or super-capacitor. In certain embodiments, accordingly, attachment power source 30 may include (or be otherwise associated with) various power electronics, such as an inverter (not shown) for conversion of electrical power between AC and DC modes, to facilitate storage of electrical energy in, and recovery of electrical energy from, energy storage device 34.

In various embodiments, power transfer connection 32, which extends between attachment power source 30 and energy storage device 34, may be configured in a variety of ways, depending, for example, on the nature of attachment power source 30 and energy storage system 34. For example, as noted above, power transfer connection 32 may include an electrical conduit for the transfer of electrical power between power source 30 (e.g., an electric machine) and energy storage device 34 (e.g., a battery or super-capacitor assembly).

As also discussed above, energy storage device 34 may include one or more batteries (e.g., lead-acid batteries, flow-storage batteries, and so on) or a variety of other energy storage systems, such as flywheels, air compression systems, and so on. It will be understood, accordingly, that the configuration of power transfer connections 20 and 32 may depend on the configuration of attachment power source 30 and energy storage device 34 (as well as the configuration of vehicle 10) and that these power transfer connections 20 and 32 may, accordingly, include various combinations of electrical, mechanical, hydraulic, or other power transmission capabilities. For example, if energy storage device 34 includes a flywheel or other mechanical device, power transfer connection 32 may include a rotating shaft for transfer of rotary mechanical power (or another relevant mechanical transmission device). Similarly, if energy storage device 34 includes a hydraulic energy storage device (or similar mechanism), power transfer connection 32 may include a fluid conduit for transmission of hydraulic pressure.

In certain embodiments, supplemental power attachment 12 may include control system 36, which may include one or more computing devices (e.g., one or more processor devices, one or more memory architectures, and so on). For example, control system 36 may include primary controller 38 (e.g., a general or special purpose controller including one or more processor devices), one or more memory storage devices of various forms (not shown), one or more additional controllers (e.g., supervisory controller 40), and so on. In addition, control system 36 may include (or be configured to communicate with) various signal-carrying (e.g., electrical) connections to various other components of attachment 12 (or vehicle 10). For example, signal lines 42 and 44 may facilitate, respectively, the transfer of electrical signals between control system 36 and attachment power source 30 and energy storage device 34.

As depicted in FIG. 2, for example, and as discussed in greater detail below, controller 36 may operate to facilitate transfer of power from vehicle 10 to attachment 12 when vehicle power source 14 has surplus capacity and transfer power from attachment 12 to vehicle 10 (or implement 16) when vehicle 10 is experiencing a power deficit (e.g., when the power requirements of vehicle 10 and implement 16 exceed the power delivery capability of vehicle power source 14). For example, when power source 14 has surplus capacity, rotary power may be transferred via out-board PTO shaft 20a and input/output shaft 20b (or another mechanical power transfer connection 20) to electric machine 30. Electric machine 30 may convert received mechanical power to electrical power and electrical power may be transmitted via power transfer connection 32 from electric machine 30 to battery assembly 34. At a later time, when additional power is needed at vehicle 10 (e.g., when implement 16 is being engaged in a power-intensive lifting operation), electrical power may be transferred from battery assembly 34 via power transfer connection 32 to electric machine 30. Electric machine 30 may accordingly convert this electrical power to rotary mechanical power, which may be transmitted by power transfer connection 20 for use by vehicle 10 (or implement 16). As also discussed above, mechanical (or other) power may be transferred from power transfer connection 20 to vehicle 10 (or implement 16) in a variety of ways. For example, in certain embodiments, a summing gearbox (e.g., a summing planetary gear-set) may receive mechanical power from power transfer connection 20 and may facilitate addition of this power to mechanical power provided by vehicle power source 14.

This disclosure includes discussion of electronic and computational control of energy storage and transfer via vehicle attachment 12 (e.g., via computing devices included in controller 36). It will further be understood that control may be effected in other ways and that system 36 may be (or may include) various types of control devices. For example, control system 36 may be a mechanical, hydraulic, electro-mechanical, hydro-mechanical, or hydro-electrical control system, and so on.

Similarly, although control system 36 is depicted in FIG. 2 (and may be discussed herein) as being physically separate from other components of supplemental power attachment 12 (except for the connections via signal lines 42 and 44, for example), it will be understood that other configurations may be possible. For example, control system 12 (or portions thereof) may be integrated into attachment power source 30, energy storage device 34, a combination of attachment power source 30 and energy storage device 34, or another component of or in communication with vehicle attachment 12.

In certain embodiments, attachment power source 30, power transfer connection 32, and energy storage device 34 (as well as various other components of the described systems, such as power transfer connection 20) may each be included in (or configured to operate with) an energy recovery system (not shown) supported by chassis 12. Such a system, as in known in the art, may allow the recovery of kinetic energy from moving vehicles, and the storage of that energy for later use, using a variety of means, such as mechanical flywheels, electrical machines, or other devices. For example, as vehicle 10 slows in speed (e.g., due to a braking operation), kinetic energy from vehicle 10 may be transferred to attachment 12 via power transfer connection 20 (e.g., a rotating shaft connection) and converted to another form (e.g., electrical energy) by attachment power source 30. Such converted (e.g., electrical energy) may then be transferred to energy storage device 34 (e.g., lithium-ion batteries), via power transfer connection 32, for storage. Usefully, this stored energy may later be supplied back to vehicle 10 (or implement 16), including through a reversed flow: i.e., from energy storage device 34 to attachment power source 30 via power transfer connection 32, and from power source 30 via power transfer connection 20 to vehicle 10 (or implement 16).

Figure 3:
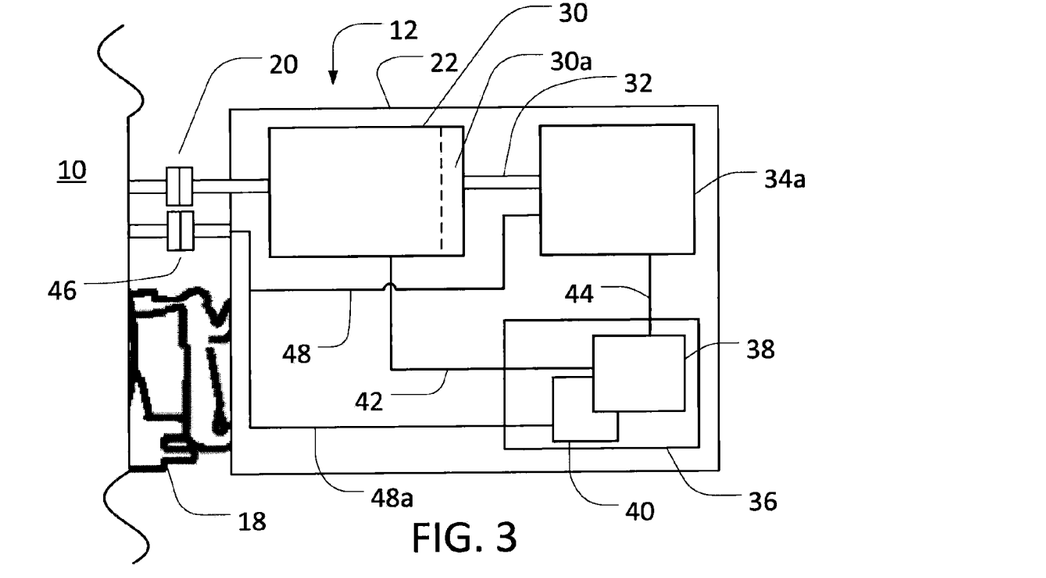
FIG. 3 is a diagrammatic view of another supplemental power attachment associated with the example vehicle of FIG. 1.

In certain embodiments, multiple power transfer connections may be included between vehicle 10 and supplemental power attachment 12. Referring now also to FIG. 3, power transfer connection 20 may be configured, for example, as a rotary shaft for transferring mechanical power between a PTO (or other) interface on vehicle 10 and electric machine 30. Further, power transfer connection 46 may be configured as an electrical connection between an electrical system of vehicle 10 (not shown) and various electrical components of attachment 12 (e.g., batteries 34 and control system 36), via signal lines 48 and 48a. In certain embodiments, as another example, various power transfer connections may be implemented in nested configurations. For example, in certain embodiments, power transfer connection 20 may include two independently rotatable, concentric shafts.

As such, for example, power may be transferred between vehicle 10 (or implement 16) and supplemental power attachment 12 in a variety of forms. For example, surplus mechanical power from vehicle power source 14 (e.g., an IC engine) may be delivered to electric machine 30a via mechanical power transfer connection 20. This power may be converted to electricity and stored in batteries 34a for various amounts of time. When additional power is required at vehicle 10 (or implement 16), power may then be transferred from supplemental power attachment 12 to vehicle 10 (or implement 16) in a variety of ways. For example, electrical power may be converted to mechanical power within attachment 12 (as discussed above, for example) and the mechanical power transferred to vehicle 10 (of implement 16) via mechanical power transfer connection 20. Additionally or alternatively, for example, electrical power may be transferred directly from batteries 34a, via electrical power transfer connection 46, to various electrical components of vehicle 10 (or implement 16). Likewise, if vehicle 10 is equipped with an electrical generator (e.g., as part of vehicle power source 14), surplus power at vehicle 10 may be converted to electrical power on-board vehicle 10, and this electrical power may be transferred directly from vehicle 10 to batteries 34a.

It will be understood, with respect to the example above (and other example configurations discussed herein), that other variations may be possible. For example, in certain embodiments, both electrical and mechanical power may be transferred between vehicle 10 and vehicle attachment 12 simultaneously. To facilitate this, for example, power transfer connection 20 may include both mechanical and electrical power transfer capabilities, or vehicle 10 and attachment 12 may be linked by multiple power transfer connections (e.g., a mechanical connection and a separate electrical connection).

Figure 4:
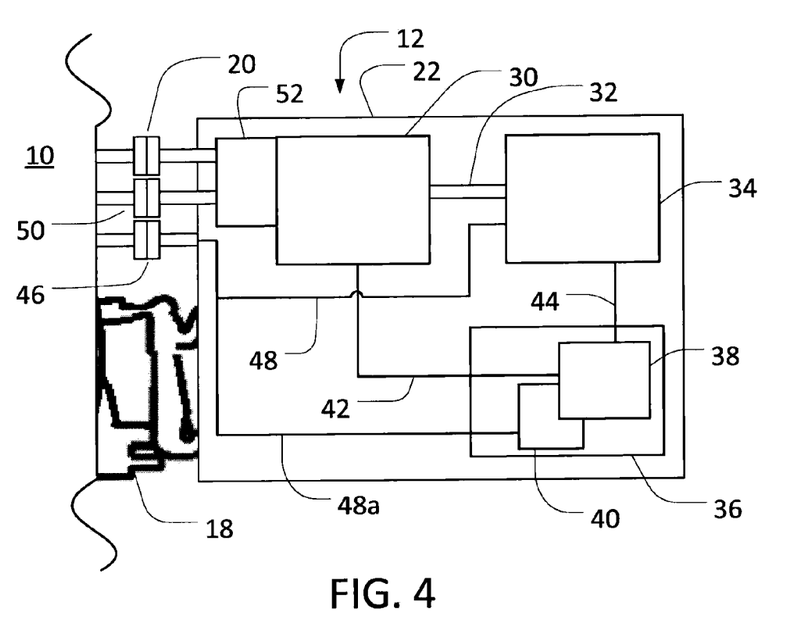
FIG. 4 is a diagrammatic view of another supplemental power attachment associated with the example vehicle of FIG. 1.

Referring now also to FIG. 4, various other configurations may be possible, including embodiments with multiple power transfer connections between vehicle 10 and attachment 12. For example, in certain embodiments both of power transfer connections 20 and 50 may be configured to transmit mechanical power, and power transfer connection 46 may be configured to transfer electrical power. For example, power transfer connection 20 may be a rotating shaft geared for one particular rotational speed and power transfer connection 50 may be a rotating shaft geared for a different particular rotational speed. In such a configuration, for example, power conversion device 52 (e.g., a mechanical or other gearbox) may be associated with attachment power source 30. For example, power conversion device 52 may facilitate switching the output of (or input to) attachment power source 30 between different power sources (or power recipients) associated with vehicle 10. For example, vehicle 10 may be configured such that power received at vehicle 10 via power transfer connection 20 supplements power provided by vehicle power source 14 (e.g., an IC engine) to the vehicle wheels, whereas power received at vehicle 10 via power transfer connection 50 supplements power provided to implement 16. Accordingly, depending on the operational needs of vehicle 10 and implement 16, power may be provided from supplemental power attachment 12 directly to either vehicle 16 (i.e., directly to the wheels of vehicle 16) or implement 16, with power conversion device 52 (e.g., as a mechanical gearbox) serving as a selector between the power transfer modes.

In certain embodiments, in addition or as an alternative to serving as an input/output selector, power conversion device 52 may serve as a speed converter (e.g., if configured as a mechanical gearbox with multiple gear ratios). For example, if the rotary speed provided by power transfer connection 20 is not appropriate for electrical power generation by attachment power source 30 (e.g., the input speed from power transfer connection 20 is too slow), power conversion device 52 may be configured as a mechanical (or other) gearbox to increase (or otherwise alter) the rotational speed of the power received from power transfer connection 20 in order to facilitate use of that power to generate electricity at attachment power source 30. Similarly, in certain embodiments, power conversion device 52 may reduce the speed of (or otherwise alter) output rotation from attachment power source 30 for delivery of mechanical power to vehicle 10 (or implement 16). It will be understood that power conversion device 52, in certain embodiments, may not necessarily be located as depicted in FIG. 4, and that power conversion device 52 may include various types of power converting mechanisms, including hydraulic, electrical, or mechanical devices, and so on.

As also noted above, various combinations and sub-combinations of the configurations described herein may be possible. For example, attachment 12 may include power conversion device 52 (e.g., a speed-reducing or speed-increasing gearbox) in combination with only a single power transfer connection between vehicle 10 and attachment 12. In this way, for example, supplemental power attachment 12 may be customizable, in order to accommodate various power input/output capabilities of a particular vehicle, as well as various power needs associated with the vehicle (and various associated implements).

In various embodiments the flow of power into, out of, and within supplemental power attachment 12 (and various other functionality) may be controlled by a control system within (or in communication with) attachment 12. For example, as noted above, attachment 12 may include control system 36, which may itself include primary controller 38 and various other components (e.g., supervisory controller 40). Control system 36 (e.g., including controller 38) may be configured to receive signals from and send signals to vehicle 10 and various components of attachment 12 (e.g., attachment power source 30 and energy storage device 34) via various known means, including through signal lines 42, 44, 48, 48a and signal-carrying conduits within various power transfer connection(s) between attachment 12 and vehicle 10. It will be understood, similarly, that control system 36 (or components thereof) may additionally or alternatively communicate wirelessly with various components of attachment 12 or vehicle 10, and so on. It will further be understood, for example, as also discussed throughout this disclosure, that various alternative configurations may be possible. For example, control system 36 may include only a single controller (not shown) in place of primary controller 38 and supervisory controller 40, or may include multiple controllers beyond (or in place of) primary controller 38 and supervisory controller 40. Further, various other combinations and configurations will be apparent to those of skill in the art.

Accordingly, in certain embodiments, control system 36 (e.g., via primary controller 38), based upon various parameters (e.g., as monitored by supervisory controller 40), may direct transfer of power from vehicle 10 to attachment 12 when vehicle power source 14 has surplus capacity, and may transfer power from attachment 12 to vehicle 10 (or implement 16) when vehicle 10 is experiencing a power deficit (e.g., when the power requirements of vehicle 10 and implement 16 exceed the power-delivery capability of vehicle power source 14). In this way, surplus energy from vehicle 10 may be appropriately stored (i.e., within attachment 12), for later delivery to vehicle 10 (or implement 16) when additional power is needed.

Figure 5:
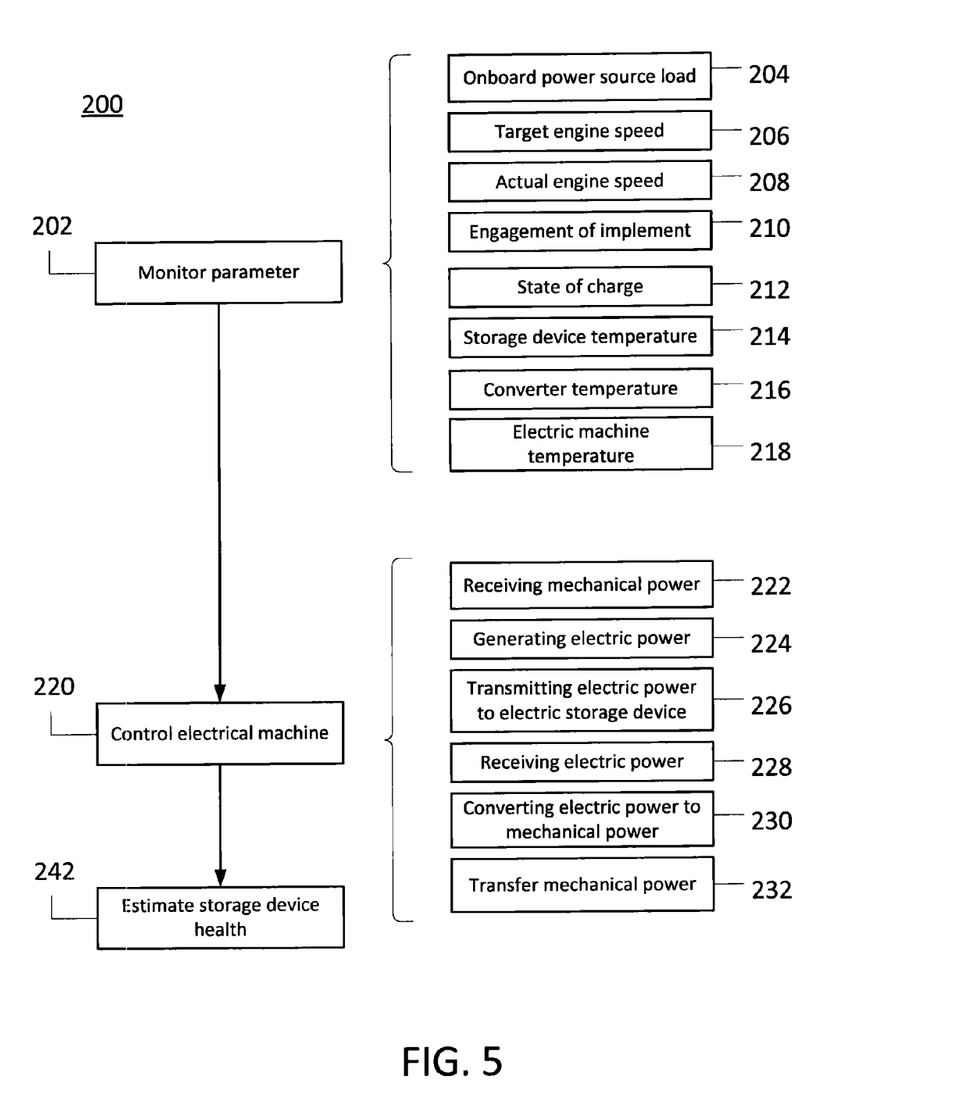
FIG. 5 is a diagrammatic view of a modeling approach associated with the engine of FIG. 2 or FIG. 3.

For example, referring now also to FIG. 5, an example control method for attachment 12 is presented. In certain embodiments, for example, supervisory controller 40 (or another component of control system 36) may be configured to monitor 202 one or more parameters associated with vehicle 10 or attachment 12. For example, supervisory controller 40 may monitor 202 parameters including: load 204 to which onboard power source 14 is being (or has been) subjected; target engine speed 206 for onboard power source 14; actual engine speed 208 of onboard power source 14; a state of engagement 210 of implement 16 (e.g., whether implement 16 is being utilized, the current (or expected) power requirements of implement 16, and so on); state of charge 212 of energy storage device 34 (e.g., the percentage of a maximum electric charge being held by a battery pack included in storage device 34); temperature 214 associated with energy storage device 34; temperature 216 associated with a power converter in communication with attachment power source 30 and energy storage device 34 (e.g., as depicted in FIG. 2, AC-DC inverter 30a associated with electric machine 30 and a battery pack 34); temperature 218 associated with attachment power source 30 (e.g., temperature 218 of an electric machine); and so on.

These monitored 202 parameters, individually or collectively, may then usefully inform control 220 of attachment power source 30 (e.g., control of an electric machine by primary controller 38). For example, based on monitoring 202 load 204 of onboard power source 14 (e.g., an IC engine) and state of charge 212 of energy storage device 34 (e.g., a battery pack), control system 36 may determine that onboard power source 14 currently has spare capacity and that energy storage device 34 is not yet fully charged. As such, control system 36 may direct transfer of mechanical power from onboard power source 14, via power transfer connection 20, to attachment power source 30 (e.g., configured as an electric machine), for conversion to electricity and storage within energy storage device 34. Subsequently, for example, and still based upon monitoring 202 various parameters such as load 204 of power source 14, control system 36 may determine that vehicle 10 (or implement 16) is in need of supplemental power and may control the flow of power in the reverse direction (e.g., from energy storage device 34 to vehicle 10 (or implement 16), via attachment power source 30).

Figure 6:
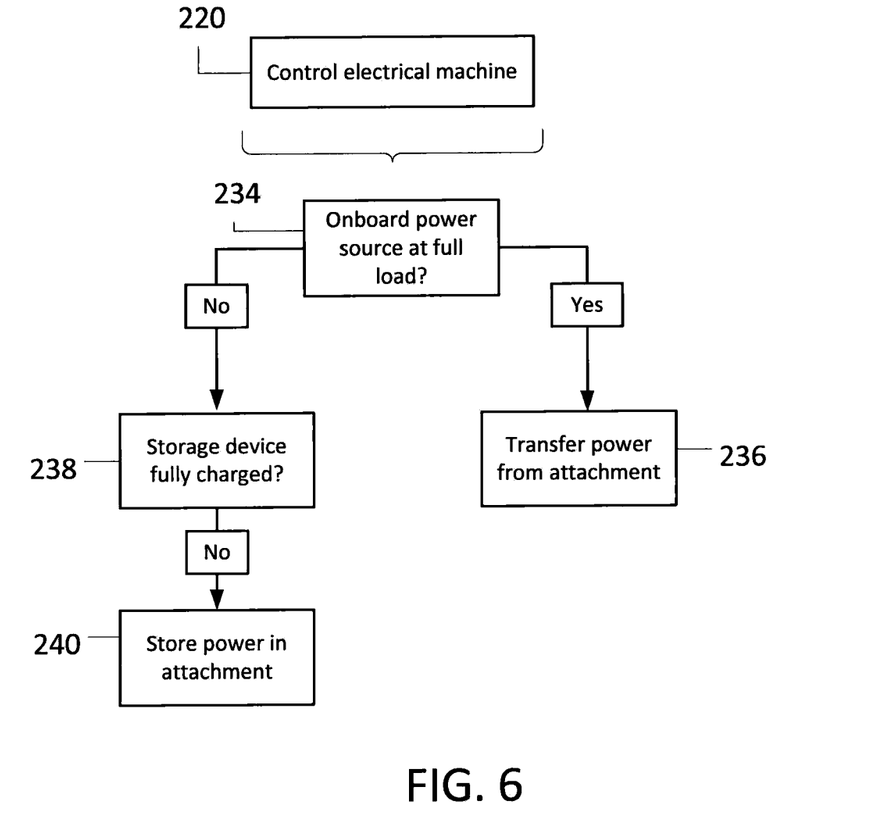
FIG. 6 is a diagrammatic view of an aspect of the modeling approach of FIG. 5.

As such, for example, control system 36 may be configured to control 220 attachment power source 30 (e.g., configured as an electric machine) in receiving 222 mechanical power from vehicle 10, generating 224 electrical power, and transmitting 226 the generated 224 electrical power to energy storage device 34 (e.g., configured as a battery pack). Likewise, control system 36 may be configured to control 220 attachment power source 30 in receiving 228 electrical power from energy storage device 34, converting 230 the received 228 electrical power to mechanical power, and transferring 232 the converted 230 mechanical power to vehicle 10 (or implement 16). Further, as also noted above, and referring now also to FIG. 6, such control 220 may include analysis 234 of whether onboard power source 14 is operating at full load. If yes (and if additional power is needed by vehicle 10 or implement 16), then power may be transferred 236 from attachment 12 to vehicle 10 (or implement 16). If no, and if it is determined 238 that energy storage device 34 is not fully charged, then power may be transferred from vehicle 10 to attachment 12 for storage 240 in energy storage device 34.

It will be understood that control system 36 may additionally or alternatively serve a variety of other purposes relating to the above-described power management. For example, in certain embodiments, control system 36 may execute diagnostic analysis with respect to various components of attachment 12 (or vehicle 10). For example, in certain embodiments, based upon various monitored 202 parameters, control system 36 may estimate 242 the health of energy storage device 34. For example, where energy storage device 34 may be configured to include a battery pack, control system 36 may estimate 242 factors such as the maximum charge-holding capacity of the battery pack, the charge and discharge times of the battery pack, and so on, in order to provide diagnostic information (e.g., an indicator that the battery pack should be replaced or repaired).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, aspects of the disclosed subject matter may be embodied as a method, system, (e.g., a work vehicle control system included in vehicle 10) or computer program product. Accordingly, certain embodiments (e.g., of control system 36 or control method 200 implemented thereby) may be implemented entirely as hardware, entirely as software (including firmware, resident software, micro-code, etc.) or as a combination of software and hardware aspects. Furthermore, certain embodiments may take the form of a computer program product on a computer-usable storage medium having computer-usable program code embodied in the medium.

Any suitable computer-usable or computer-readable medium may be utilized. The computer-usable medium may be a computer-readable signal medium or a computer-readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be non-transitory and may be any computer-readable medium that is not a computer-readable storage medium and that can communicate, propagate, or transport a program for use by or in connection with an instruction execution system, apparatus, or device.

Aspects of certain embodiments are described herein with reference to flowchart illustrations and/or block diagrams of methods, apparatus (systems) and computer program products according to embodiments of the invention. It will be understood that each block of any flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or event specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function or event specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions or event specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A vehicle attachment for providing supplemental power to a vehicle including an onboard power source and an implement associated with the vehicle, the attachment comprising:
    a chassis configured to be attached to the vehicle,
    an attachment power source including an electric machine supported by the chassis;
    an energy storage device including an electric storage device supported by the chassis and configured to receive power from the attachment power source;
    one or more power transfer connections between the vehicle and one or more of the attachment power source and the energy storage device; and
    a control system including a controller, the control system being configured to one or more of transmit a signal to and receive a signal from one or more of the attachment power source and the energy storage device;
    wherein the control system, the attachment power source, and the energy storage device are configured to provide power from one or more of the attachment power source and the energy storage device, via the one or more power transfer connections, to one or more of the vehicle and the implement associated with the vehicle; and
    wherein the control system is further configured to cause storage of electric power in the electric storage device when the onboard power source is not at full load, and when the onboard power source is at full load, to cause transfer of power from the vehicle attachment to one or more of the vehicle and the implement associated with the vehicle.

2. The vehicle attachment of claim 1, wherein the one or more power transfer connections are configured to transmit rotational power between the attachment power source and a power take-off shaft included in the vehicle.

3. The vehicle attachment of claim 1, wherein the one or more power transfer connections are configured to transmit electric power between the one or more of the attachment power source and the energy storage device and one or more of the vehicle and the implement associated with the vehicle.

4. The vehicle attachment of claim 1,
    wherein the electric machine is configured to: receive mechanical power from the onboard power source via the one or more power transfer connections; utilize the received mechanical power to generate electric power; transmit the generated electric power to the electric storage device for storage; receive electric power from the electric storage device for conversion to mechanical power; and transfer the converted mechanical power to one or more of the vehicle and the implement associated with the vehicle via the one or more power transfer connections.

5. The vehicle attachment of claim 4, further comprising a supervisory controller included in the control system;
    wherein the supervisory controller is configured to: monitor one or more parameters including one or more of an onboard power source load, a target engine speed associated with the onboard power source, an actual engine speed associated with the onboard power source, a state of engagement of the implement associated with the vehicle, a state of charge of the electric storage device, an electric storage device temperature, a temperature of a converter in electronic communication with the electric machine and the electric storage device, and an electric machine temperature; and
    wherein the control system is further configured to one or more of: estimate electric storage device health, control flow of power between the electric machine and the electric storage device, and control flow of power into and out of the vehicle attachment via the one or more power transfer connections, based upon, at least in part, the supervisory controller monitoring the one or more parameters.

6. The vehicle attachment of claim 1, wherein the energy storage device includes an energy recovery system.

7. The vehicle attachment of claim 1, wherein the chassis is configured to be attached to, and to be fully supported by, a rear portion of the vehicle.

8. A vehicle attachment for providing supplemental power to a vehicle including an onboard power source and an implement associated with the vehicle, the attachment comprising:
    a chassis configured to be attached to the vehicle,
    an attachment power source supported by the chassis;
    an energy storage device including a hydraulic energy storage device supported by the chassis and configured to receive power from the attachment power source;
    one or more power transfer connections between the vehicle and one or more of the attachment power source and the energy storage device; and
    a control system including a controller, the control system being configured to one or more of transmit a signal to and receive a signal from one or more of the attachment power source and the energy storage device;
    wherein the control system, the attachment power source, and the energy storage device are configured to provide power from one or more of the attachment power source and the energy storage device, via the one or more power transfer connections, to one or more of the vehicle and the implement associated with the vehicle.

9. A control system for a vehicle attachment, comprising:
    one or more processor devices; and one or more memory architectures coupled with the one or more processor devices;

wherein the vehicle attachment includes:
- a chassis configured to be attached to a vehicle, the vehicle including an onboard power source;
- an attachment power source including an electric machine supported by the chassis;
- an energy storage device including an electric storage device supported by the chassis and configured to receive power from the attachment power source; and
- one or more power transfer connections between the vehicle and one or more of the attachment power source and the energy storage device;

wherein the one or more processor devices are configured to at least one of transmit a signal to and receive a signal from one or more of the attachment power source and the energy storage device in order to control provision of power from one or more of the attachment power source and the energy storage device, via the one or more power transfer connections, to one or more of the vehicle and an implement associated with the vehicle; and wherein the one or more processor devices are further configured to cause storage of electric power in the electric storage device when the onboard power source is not at full load, and, when the onboard power source is at full load, to cause transfer of power from the vehicle attachment to one or more of the vehicle and the implement associated with the vehicle.

10. The control system of claim 9, wherein the one or more power transfer connections are configured to transmit rotational power between the attachment power source and a power take-off shaft included in the vehicle.

11. The control system of claim 9, wherein the one or more power transfer connections are configured to transmit electric power between the one or more of the attachment power source and the energy storage device and one or more of the vehicle and the implement associated with the vehicle.

12. The control system of claim 9, wherein the one or more processor devices are further configured to control the electric machine in: receiving mechanical power from the onboard power source via the one or more power transfer connections; utilizing the received mechanical power to generate electric power; transmitting the generated electric power to the electric storage device for storage; receiving electric power from the electric storage device for conversion to mechanical power; and transferring the converted mechanical power to one or more of the vehicle and the implement associated with the vehicle via the one or more power transfer connections.

13. The control system of claim 12, wherein the one or more processor devices are further configured to:
- monitor one or more parameters including one or more of an onboard power source load, a target engine speed associated with the onboard power source, an actual engine speed associated with the onboard power source, a state of engagement of the implement associated with the vehicle, a state of charge of the electric storage device, an electric storage device temperature, a temperature of a converter in electronic communication with the electric machine and the electric storage device, and an electric machine temperature; and
- based upon, at least in part, monitoring the one or more parameters, one or more of estimate electric storage device health, control flow of power between the electric machine and the electric storage device, and control flow of power into and out of the vehicle attachment via the one or more power transfer connections.

14. The control system of claim 9, wherein the energy storage device includes an energy recovery system.

15. The control system of claim 9, wherein the chassis is configured to attach to, and to be fully supported by, a rear portion of the vehicle.

16. A control system for a vehicle attachment, comprising:
- one or more processor devices; and
- one or more memory architectures coupled with the one or more processor devices;

wherein the vehicle attachment includes:
- a chassis configured to be attached to a vehicle, the vehicle including an onboard power source;
- an attachment power source supported by the chassis;
- an energy storage device including a hydraulic energy storage device supported by the chassis and configured to receive power from the attachment power source; and
- one or more power transfer connections between the vehicle and one or more of the attachment power source and the energy storage device; and wherein the one or more processor devices are configured to at least one of transmit a signal to and receive a signal from one or more of the attachment power source and the energy storage device in order to control provision of power from one or more of the attachment power source and the energy storage device, via the one or more power transfer connections, to one or more of the vehicle and an implement associated with the vehicle.

* * * * *